May 3, 1932.  F. KRATZ  1,857,053
SERVO-MECHANISM FOR BRAKES
Filed April 27, 1929 2 Sheets-Sheet 1
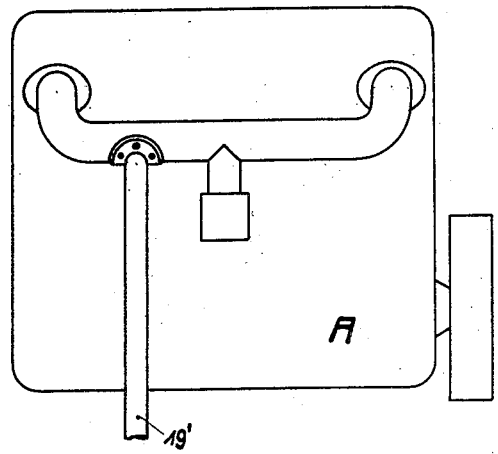
Fig. 1.
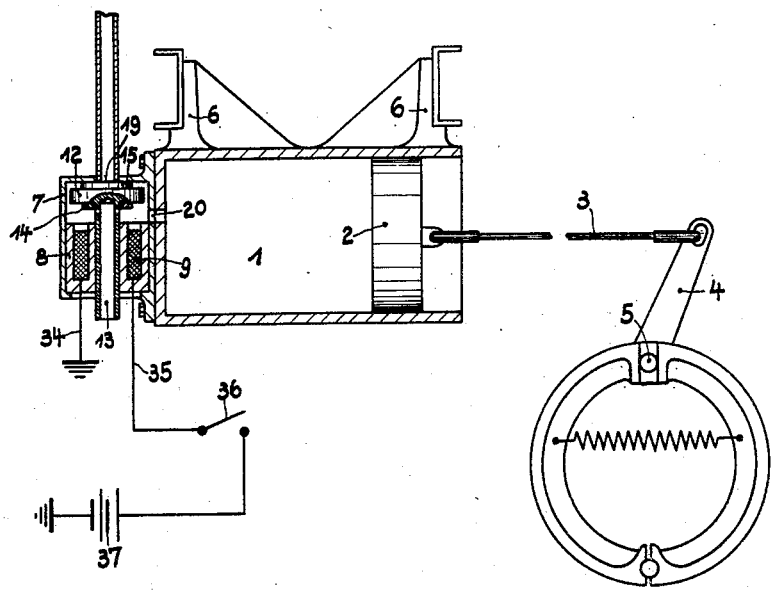
Inventor
Franz Kratz
by Steward & McKay
his attorneys

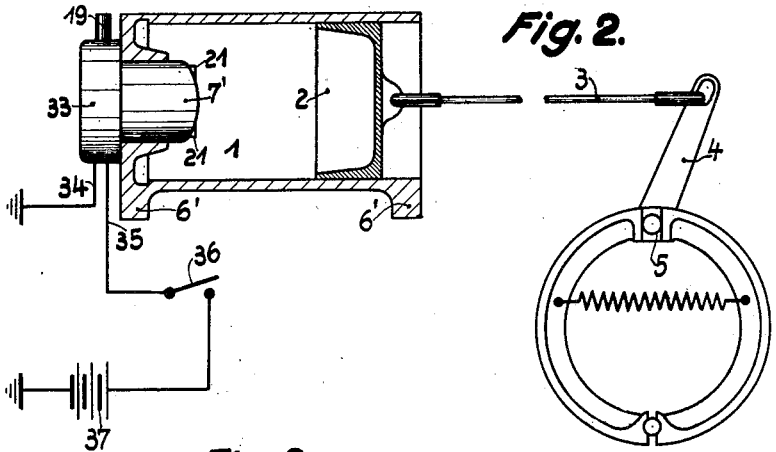
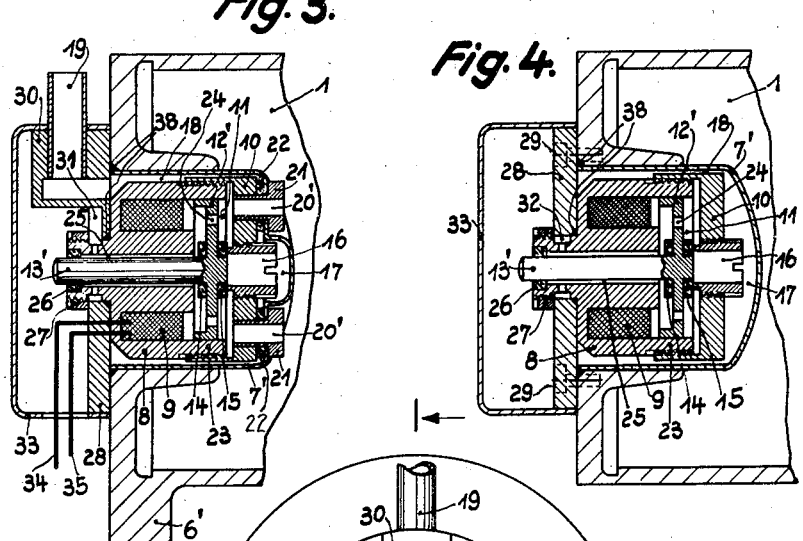
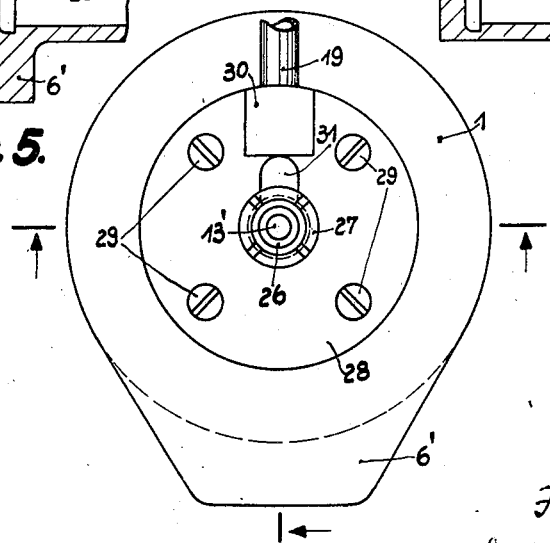

Patented May 3, 1932

1,857,053

UNITED STATES PATENT OFFICE

FRANZ KRATZ, OF STUTTGART, GERMANY, ASSIGNOR TO SERVO-FREIN DEWANDRE, SOCIETE ANONYME, OF LIEGE, BELGIUM

SERVO-MECHANISM FOR BRAKES

Application filed April 27, 1929, Serial No. 358,646, and in Germany May 4, 1928.

The present invention relates to servo-mechanism for brakes and more particularly to valve gear for such mechanism.

The object of the present invention is to provide an improved valve arrangement for servo-mechanism which will serve to render servo mechanism easily adaptable to various constructions.

The cylinders of such mechanisms have to be introduced subsequently into a finished vehicle and secured to the frame of the vehicle in very different manners for instance by means of flanges on the cylinder head or by being bracketed to the cylinder casing and the flanges or brackets have to be in all kinds of positions. These very varying structural requirements render the use and development of servo brakes very difficult, since in the construction hitherto known the valves and housings are rigidly connected with the cylinder so that the corresponding valve system must be manufactured along with the cylinder and must be kept in stock.

This disadvantage is overcome according to the invention by the valves required for the control of the brake cylinder being constructed together with their actuating members and the feed and discharge pipes for the vacuum or pressure used on braking in a housing removable from the cylinder.

This valve system assembled in one housing can be mounted as whole so as to be easily removable either in a suitable position externally of the cylinder or in the end of the cylinder. This latter construction has the additional advantage that the length of the auxiliary power unit can be reduced since the greater portion of the valve housing can project into the hollow chamber of the piston.

Two forms of construction are shown diagrammatically in the accompanying drawings in which:—

Figure 1 shows the arrangement of a valve system on the end of the cylinder of a brake servo-mechanism operated by the vacuum set up by an internal combustion engine.

Figure 2 shows the construction of a valve system in the end of the cylinder of a brake servo-mechanism.

Figures 3-5 show details of the brake valve system shown in Fig. 2.

In Figure 1, 1 is a brake cylinder and 2 a brake piston sliding therein. The piston is connected by a cable 3 with a lever 4 actuating brake cams 5. The cams force apart in known manner brake shoes which are urged together by springs. The cylinder 1 is secured to transverse members of the frame of the vehicle by means of two brackets.

A housing 7 for the valve control mechanism is removably secured to the base or head of the cylinder by flanges. It contains a pot-shaped magnet 8 with its winding 9 which has a valve plate 12 as armature. This is guided by its hollow stem 13. The boring of the stem opens at its lower end into the atmosphere and at its upper end transverse borings pass through the stem below the valve plate and connect the interior of the housing 7 through the boring of the stem with the atmosphere when the valve plate is raised so that the transverse borings of the stem emerge from the core of the pot-magnet 8 guiding the same. The portion of the housing 7 containing the valve plate 12 is provided with one aperture 19 which is connected by a pipe 19′ with the suction pipe of the engine A and a second aperture 20 corresponding to a hole in the cylinder base. Packing discs 15 and 14 form the sealing surfaces of the valve plate 12 when this is drawn upwards towards the bottom of the housing 7 or downwards towards the end of the pot-magnet 8.

The ends of the winding 9 of the pot-magnet are led to terminals 35 and 34. Terminal 34 is connected to earth and 35 is connected through a switch 36 with one pole of a battery 37, the other pole of which is also earthed.

As long as the engine is running and the switch 36 is not closed, the plate 12 is drawn towards the base of the housing 7 under the suction effect of the pipe 19′. The housing is thereby cut off from the pipe 19 but is connected with the atmosphere by the longitudinal boring of the valve stem 13 and its transverse apertures. The chamber of the brake cylinder between the piston and the cylinder base is consequently also connected with the atmosphere via the duct 20; the pressure on both sides of the piston is consequently the same and the brake is released.

When the switch 36 is closed the pot-magnet 8 is excited and the plate 12 is drawn towards the end of the pot-magnet notwithstanding the suction effect of the pipe 19'. The transverse apertures of the valve stem move into the central boring of the pot-magnet and thereby cut off the interior of the housing 7 from the atmosphere. This chamber is therefore closed against the atmosphere and opened to the suction effect of the pipe 19 which can be propagated through the duct 20 to the closed cylinder chamber. The piston 2 is moved to the left under the pressure of the atmosphere on the right hand side and applies the brake.

In Figure 2 the brake cylinder 1 may be secured to the frame of the vehicle by flanges 6'. A housing 7' projects into a recess in the end of the cylinder. This housing 7' encloses a pot-magnet 8 and its winding 9, a cap 10 which is screwed on to the pot-magnet and cuts off the valve chamber 11 from the base of the housing, and a valve 12' with stem 13' and packing washers 14 and 15.

The cap 10' has three apertures, one indicated by 16, which is located on the axis of the valve and connects the valve chamber 11 with the coupling chamber 17, an annular duct 18, a suction pipe 19 and two side apertures 20' which lead from the valve chamber into the interior of the cylinder and therefore pass through the base of the housing. These two apertures 20' are formed of threaded tubes with flanges 21 and secure the housing 7', which is here recessed, to the cap 10' and are supported by washers 22. The valve plate 12' slides in the projecting end 23 of the pot-magnet 8 and is provided with perforations 24 to allow of unimpeded balancing of pressure between the two portions of the valve chamber. The valve stem 13' projects through the boring 25 of the core of the magnet and is guided at its free end in a bush 26. The latter rests in an extension of the core of the magnet in the form of a collar which is provided on its outer periphery with an annular groove 32 connected by a plurality of radial orifices with the longitudinal boring 25 of the core of the magnet.

The pot-magnet is secured by a nut 27 against a plate 28 which is secured to the end of the cylinder by screws 29. The plate 28 has an eye 30 into which is inserted the end of the suction pipe 19. A recess 31 in the end face of the plate 28 connects the annular groove 32 in the collar of the magnet with the atmosphere, as the side walls of the hood 33 covering the flange 28 is open at one side. One end 34 of the winding 9 of the magnet is connected to earth and the other end 35 through a switch 36 with one pole of a battery 37. The other pole of the battery is also earthed.

When the switch 36 is closed, the pot-magnet 8 is excited and the valve member 12' is drawn towards the end of the magnet against the vacuum in the pipe 16, 17, 18, 19.

The supply of atmospheric air through 31, 32, 25 is thereby cut off and the suction air duct 16 is opened. The result is that air is sucked from the valve chamber 11 and through the orifices 20' out of the cylinder. The piston 2 moves to the left under the pressure of the atmosphere on its right hand end and applies the brakes.

If the switch 36 is then opened, the magnet 8 releases the valve member which is drawn towards the mouth of the duct 16 by the suction effect therein. The washer 15 cuts off the duct 16 whilst the washer 14 opens. The atmosphere can now enter the cylinder through the opening in the hood 33, the recess 31, annular duct 32, transverse apertures in the collar of the magnet, the annular chamber 25 between the valve stem and the boring of the magnet, the holes 24 in the valve member 12' and the apertures 20 and set up equalization of pressure between the right and left hand sides of the piston. A recoil spring returns the brake member into its initial position again and the brakes are released.

In order to prevent unintentional admission of air into the cylinder, narrow rubber rings 38 are inserted at the edges to be sealed which press on the bevelled edges of the guide members on assembling the valve parts and on setting up the valve system.

The constructions described above by way of example show that considerably greater latitude is allowed than previously in the manufacture and stocking of cylinders for brake servo-mechanisms when valve gear constructed according to this invention is employed since for various structural conditions the supply of valve systems which need be held in stock need only be a fraction of the number of the cylinders which must be stocked.

I claim:

1. A brake servo mechanism comprising a cylinder having an opening in the head thereof, said cylinder having a bevelled surface at the outer end of said opening, a piston within said cylinder having operative connection to the brake operating means, a plate, a housing inserted in said opening and detachably secured to said plate, means to detachably fasten the plate to the head of the brake cylinder, a sealing ring in the space formed at the junction of the surface of the housing with the flat radial surface of the plate and the bevelled surface at the outer end of the opening in the head of the brake cylinder, said housing having passages connecting the housing to the interior of said cylinder, valve means in said housing for controlling the flow of fluid through said passages, and an electro-magnet in said housing for controlling said valve.

2. A brake servo mechanism comprising a cylinder having an opening in the head thereof, a piston movable in said cylinder and connected to the brake operating means, a plate, a housing inserted in said opening, a pot magnet in said housing, means to detachably fasten the plate to the head of the brake cylinder, means to secure one end of the pot magnet to said plate, a projecting annular wall at the other end of the said magnet, a cap secured to said other end of the magnet to form a valve chamber, and means to connect the housing to said cap, said housing having passages connecting the housing and said chamber to the interior of the brake cylinder, valve means in said housing for controlling the flow of fluid through said passages, and an electro-magnet in said housing for operating said valve.

3. A brake servo mechanism comprising a cylinder having an opening in the head thereof, a piston movable in the cylinder and connected to the brake operating means, a plate, a housing inserted in said opening and detachably secured to said plate, means for fastening the plate to the brake cylinder, a pot magnet in said housing, a cap forming a chamber with the open annular end of the wall of the pot magnet, a two-faced valve within said chamber, a stem for said valve, said pot magnet having a central bore for guiding said stem and forming an atmosphere duct to the valve chamber, the cap of said magnet having a central duct communicating through an annular space between the outer wall of the pot magnet and the inner wall of the housing with a source of pressure different from atmosphere, and conduits connecting the valve chamber to the interior of the brake cylinder.

4. A servo mechanism for brakes comprising a cylinder, a piston within said cylinder for operative connection with brake operating means, a housing detachably connected with said cylinder and communicating with the interior of said cylinder, a duct communicating with the interior of said housing and with pumping means, a duct communicating with the interior of said housing and with the atmosphere, an axially bored pot magnet within said housing, a double faced valve within said housing for controlling the flow of fluid through said ducts and operated by said pot magnet, a stem secured to said valve and guided in the bore of said pot magnet, the axial bore through said pot magnet forming a part of said duct connecting the interior of the housing with atmosphere.

5. A servo mechanism for brakes comprising a cylinder, a piston within said cylinder for operative connection with brake operating means, a housing detachably connected with said cylinder, an axially bored pot magnet within said housing, a duct passing through the bore of said magnet and connecting the interior of said cylinder with the atmosphere, a valve within said housing for controlling said duct, and a movable armature located in said bore for operating said valve by said magnet.

In testimony whereof I have hereunto affixed my signature.

FRANZ KRATZ.